Oct. 8, 1946.  C. H. SCOTT ET AL  2,409,071
VENTING AND DISCHARGE VALVES FOR TANKS
Filed May 25, 1940

INVENTORS
CARLYLE H. SCOTT
PAUL H. SCOTT
BY
their ATTORNEY

Patented Oct. 8, 1946

2,409,071

UNITED STATES PATENT OFFICE 2,409,071

VENTING AND DISCHARGE VALVES FOR TANKS

Carlyle H. Scott, Forest Hills, and Paul H. Scott, Flushing, N. Y., assignors to The Safety Tank Truck Corporation, New York, N. Y., a corporation of New York Application May 25, 1940, Serial No. 337,269

2 Claims. (Cl. 137—21)

This invention relates generally to a valve system for truck tanks. More particularly, it relates to a valve system for effecting the discharge of liquid stored in such tanks and for venting the tanks, either to relieve excessive pressure therein or to reduce the back pressure incident to the discharge of liquid from the tank.

While the valve system herein disclosed is particularly adapted for use with a truck tank such as is disclosed in the application for patent of Carlyle H. Scott, Serial Number 337,268, for Truck tank construction, filed on even date herewith, it is to be understood that as to certain phases thereof, it may have other applications.

In said application referred to hereinabove, the disadvantages of a valve construction and a control therefor which necessitated perforations of the tank walls and the leading of controls through stuffing boxes therein, have been fully discussed.

Besides the danger of leakage through such perforations or through the stuffing boxes, due to deterioration thereof, there is danger of the controls becoming jammed in the stuffing boxes and when such jamming occurs, repair thereof may be difficult, due to the inaccessibility of the parts. Where rigid control members are used, bending thereof may occur within the stuffing box.

It is, therefore, among the objects of my invention to provide a valve system for truck tanks providing for the discharge of liquids stored in said tanks, the provision of a breather valve for relieving excess pressure in said tanks, the provision of a breather valve adapted to open whenever the discharge or dump valve is opened, and the provision in connection with such a breather valve of safety arrangements whereby the spread of an external flame into the tank will be prevented and whereby additional means are provided for relieving excessive pressure in case of unusual pressure conditions.

It is further among the objects of my invention to provide in connection with a tank truck a system of valves comprising a discharge valve and a vent valve together with control means whereby the vent valve is maintained in open position when the discharge valve is opened, and further, the provision of a control for such a valve system whereby the vent valve will be opened first and thereafter the discharge valve will be opened, and also, whereby closing of the vent will be prevented until the discharge valve is seated in its closed position.

It is a further object of my invention to provide such a valve and control system in which all the controls are positioned exteriorly of the tank, except such controls as interconnect the vent valve and the discharge valve, and these latter are led into the body of the tank through the vent valve. According to our invention the tank wall is pierced below the liquid level only where the discharge valve opens outward and the only other perforations necessary are disposed above the level of the liquid in the tank in the top wall of the tank and such openings need only consist of an opening to receive the vent valve and an opening for the filling structure or head.

Another object of our invention is the provision of a construction in a vent valve mounting whereby binding of the valve stem is prevented.

For the attainment of these objects and such other objects as will hereinafter appear, or be pointed out, we will refer to the accompanying drawing in which.

Figure 1:
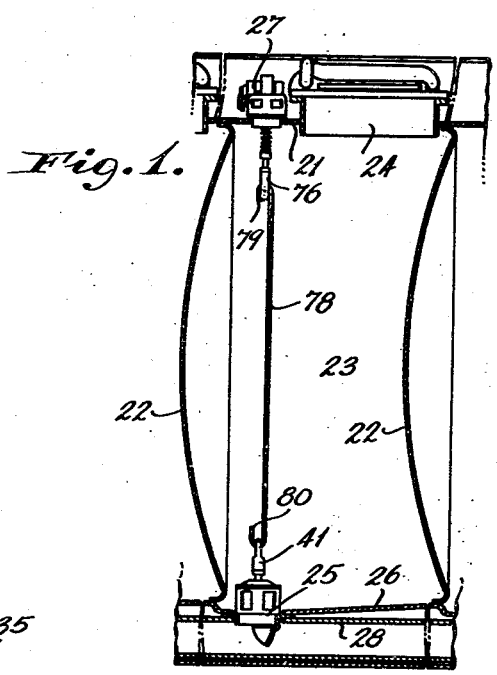
Figure 1 is a sectional view through one of the compartments of a truck tank such as is disclosed in the aforementioned co-filed application.

Before describing the details of construction of the valves, we will refer to Figure 1 in which a portion of a truck tank is shown at 21, and partitions within said tank are shown at 22. These partitions serve to divide the tank into separate and independent compartments 23 which may be individually charged through a filling head structure 24, the details of which form the subject of a separate application of Carlyle and Paul Scott, filed on even date herewith. The details will therefore be omitted from this application and reference may be had to said other application.

It will be understood that a filling arrangement 24 is provided for each compartment where the tank has several compartments.

Each compartment has further been provided with a discharge or dump valve 25.

This valve is positioned at the lowest point of the compartment 23 and for this purpose the bottom of the compartment 26 may be inclined as shown in Figure 1 toward said lowest point. Thereby complete drainage of the compartment may be secured.

In the top wall of the compartment is positioned the vent and breather valve 27 and in order to simplify the system of connections between the valves 25 and 27, we have shown these valves in vertical alignment. Obviously, however, this is not necessarily so, as for particular purposes the connections between the valves may be readily altered so as to make such vertical alignment unnecessary.

It will be understood that while we have described our valve system as applied to a single compartment of a multi-compartment tank, that it is equally applicable to tanks having only a single compartment, and furthermore, that it is applicable to tanks of types other than truck tanks. For the purpose of explaining our invention, however, the disclosure has been limited to the valve system as applied to the truck tank.

As fully explained in the first of our aforementioned applications, the discharge valve 25 is in communication with a main or manifold 28 from which the dispensing of liquid takes place.

The details of the discharge or dump valve 25 will next be described with the aid of Figure 2.

Figure 2:
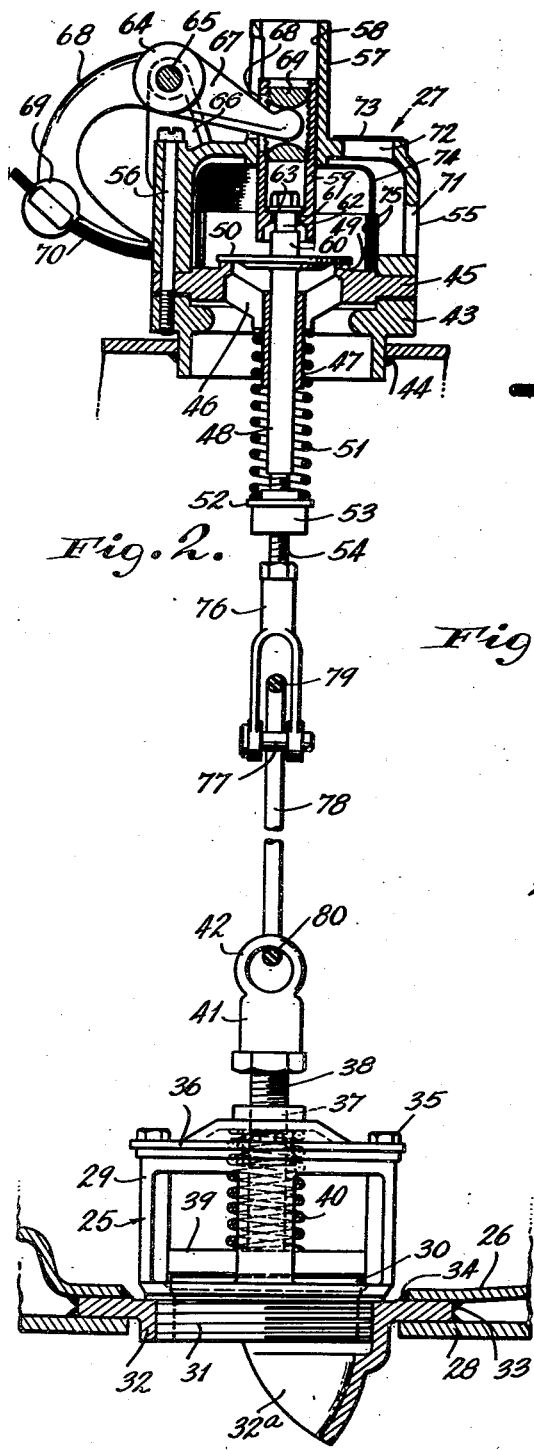
Figure 2 is a view partly in section and with portions broken away of the valve system and the connections therefor.

Said valve in Figure 2 is shown as comprising an outer cage 29 which is of skeleton construction so that the liquid has free access to the valve seat 30 which is located at the bottom of the cage and immediately above a threaded extension 31 which is adapted to seat into a plate 32 having a threaded aperture adapted to receive said extension 31. The plate 32 is suitably secured between the lower wall 26 of the compartment 23 and the upper wall of the main 28. A convenient manner of securing the plate 32 in place is by spot welding, indicated at 33 and 34.

As an additional feature we have shown the plate 32 as carrying a baffle 32a, so disposed in relation to the current of liquid flowing through the main 28 that it will prevent pressure thereof against the valve head 39 tending to raise it from its seat prematurely, as fully explained in the aforesaid co-filed application.

It may be noted that such spot welding has the obvious advantage of securing a leak proof joint between relatively thin plates which cannot be conveniently threaded.

Suitably secured to the top of the cage, as by screws 35, is a head or cap 36 provided with a bore 37 adapted to serve as a guide for a valve stem 38 which carries a valve 39 adapted to seat on the aforementioned valve seat 30. A spring 40 serves to maintain the valve 39 in its seat. The upper end of the valve stem 38 carries a member 41 having a loop 42 at its upper end. This loop serves to effect the connection between the vent valve and the discharge valve as will be described in detail hereinafter.

The details of the combined breather and vent valve will next be described.

Set into the top wall of the tank 21 or a compartment therein is a bushing 43 secured thereto as by spot welding 44.

The bushing 43 is provided with a seat for a spider 45, the arms 46 of which carry a tubular guide 47 for a valve stem 48. By mounting the spider 45 as just described, we have overcome the disadvantages of constructions heretofore employed in which the spider was threaded into its seat. Where the standard tapered pipe threads were used, this had the effect of pressing the threaded portions of the spider inward and thereby distorting the guideway for the valve stem.

A seat 49 for a valve head 50 is provided on the upper portion of the spider 45. The valve head 50 is maintained on said seat by a spring 51 bearing against the arms of the spider on one end and provided with a flange 52 at its lower end which bears against a collar 53. The collar 53 is adjustably mounted on the valve stem 48 as by being carried on a threaded extension 54 of said valve stem.

Thereby it will be observed a convenient means is provided for adjusting the spring tension in order to predetermine the internal pressure at which the valve will rise from its seat. This furnishes a convenient construction whereby the regulations of the fire department and other governmental bureaus relatively to safety vent pressures may be enforced. For example, the inspection service of such bureaus may readily adjust the position of said collar 53 and then apply a seal thereto which must be broken before the position of the collar can be changed.

It will be observed that the valve structure so far described affords a venting system whereby the pressure within the tank or compartment may be kept below predetermined limits. By a construction now to be described a manual control is provided whereby the valve head 50 may be raised whenever it is desired to maintain the pressure within the tank at substantially atmospheric pressure, whereby when the discharge valve 25 is open so as to permit discharge of the liquid from the tank or compartment the back pressure tending to prevent such discharge of liquid from the tank will be eliminated.

Mounted on the spider 45 is a cage 55. Suitable means are provided for securing the bushing 43, the spider 45 and the cage 55 together. Such means may be in the form of screws 56 threaded into the bushing 43. At its upper end the cage 55 has an extension 57 provided with a bore 58 within which is slidable a plunger 59. The plunger 59 is shown as hollow and into the lower end of said hollow extends a projection 60 carried on the valve head. A restricted portion 61 of the aforementioned bore serves to engage a portion 62 of the projection 60 which is of restricted width and which carries a flange or collar 63 at its upper end whereby as the plunger 59 is raised or lowered the projection 60 is constrained, to move with difficultly, and thereby the valve 50 is correspondingly raised or lowered.

Means for raising and lowering the plunger 59 are shown in the form of a bell crank 64 pivotally mounted as at 65 on a bracket 66 carried by the cap 55. One arm 67 of this bell crank extends through an aperture 68 of the plunger 59 into the bore thereof, and a pair of plugs 69 within said bore contact the arm 67 on both sides thereof whereby as the arm is raised or lowered, the plugs and consequently the plunger 59 are correspondingly moved up or down.

The plugs are conveniently mounted in place within the bore by threading both the plugs and the bore whereby assembly is readily effected and the position of the arm 67 relatively to the plunger is readily adjusted as desired.

The other arm 68 of the bell crank 64 is provided at the free end thereof with a curved seat 69 for a control cable 70, this seat being so contoured that as the arm is displaced angularly the cable 70 will always leave the guide in a position that is tangential thereto. For example, where the cable 70 is disposed horizontally, the curved seat or guide 69 will be of such extent that a portion of it will always be disposed directly underneath the pivot 65 so that the guide at no time can kink or bend the cable. It will be understood that clamping means of any suitable or preferred type (not shown) may be used to clamp the cable in place on the seat 69.

Figure 3:
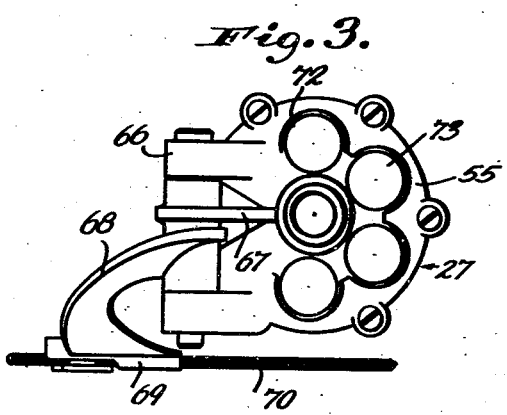
Figure 3 is a plan view of the breather or vent valve.

As shown in Figure 3, the arm 68 of the bell crank 64 may be curved laterally so that the cable 70 may be led from the end thereof and alongside the valve without striking any portions of said valve.

The cage 55 is shown as provided with laterally disposed vent openings 71 which vent openings are of sufficient area to take care of normal excesses of pressure. We have further provided auxiliary openings 72, disposed along the upper surface of the cage 55, as clearly appears in Figure 3, which are normally closed by frangible and fusible plugs 73. These plugs may be made of any suitable or preferred material, such as lead. Should the pressure suddenly increase, as by reason of an explosion, these plugs will be ruptured thereby relieving the pressure, or on the other hand, if a dangerous temperature should develop, even without excessive pressure, the plugs 73 will melt and afford extra ventilation which may serve to reduce the temperature to safe limits.

Additional safety means are shown in the form of a fire screen 74 of foraminous material, and this screen is shown as in the form of a cap having its lower free edge portions clamped within a pair of annular rings 75 and seated within the cap 55 and on the spider 45. An opening is provided in the top of the screen through which the plunger 59 may pass freely.

In order to effect operation of the discharge valve we have shown a forked member 76 carried on the threaded extension 54 of the valve stem 48 and the forked arms of this member carry a pin 77.

Interposed between the member 41 of the discharge valve 25 and the forked member 76 of the vent valve is a link 78 provided with means for engaging the member 41 and the forked arms 76 respectively. Such means is shown in the form of hook 79 adapted to hook over the pin 77 (see Figure 1) and a second hook 80 adapted to pass through the loop 42 of the member 41. It will be observed that the connection of the link 78 to the aforementioned members 76 and 41 is a loose one so that an appreciable movement of the valve stem 48 may take place before the valve stem 38 begins to move as a result of the movement of valve stem 48.

In the manual operation of the valve system just described, it will be understood that when a pull is exerted on the cable 70 the arm 67 will rise and will cause the plunger 59 to rise. The latter will raise the valve stem 48 together with the valve head 50 which will serve to establish communication between the tank or compartment and the external air.

After a time as the movement continues the hook 79 of the link 78 will engage the pin 77 and the hook 80 will engage the loop 42 so that the link 78 will act as a tension member that will constrain the valve stem 38 to move upward with the valve stem 48, thereby raising the valve head 39 of the discharge valve 25 from its seat. Due to the opening of the valve 50 no resistance to the discharge of fluid through the valve 25 is encountered. When the cable 70 is released the spring 49 will first of all cause the valve head 39 to engage its seat 30 and thereafter tension on the link 78 will be released, followed by movement of the valve head 50 onto its seat because of the action of spring 51.

It will therefore be observed that the valve system which we have described affords a unitary device that functions to effect discharge of liquid from the tank to relieve excess pressure in the tank and to protect the contents of the tank against the danger of ignition from external sources and that all the controls of said system are arranged externally of the tank and require no perforation of the same.

While we have herein described one embodiment of our invention, it will be understood that the same may be embodied in many other forms without departing from the spirit thereof, as will be observed to those skilled in the art, that the disclosure herein is by way of illustration merely, and is not to be interpreted in a limiting sense, and that we do not limit ourselves other than as called for by the language of the claims.

Having described our invention and illustrated its use, what we claim as new and desire to secure by Letters Patent is:

1. In a vent and breather valve for tanks for storing liquids having volatile components, comprising a valve seat, a valve head, yieldable means for normally holding said valve head on said seat, the combination therewith comprising a cap overlying said valve seat, and means movably mounted on said cap for lifting said valve from said seat against the resistance of said spring by a lost motion linkage whereby the valve may move independently and auxiliary discharge means for said valve comprising vent openings in said cap, a second set of vent openings in said cap, and fusible and frangible means normally closing said openings but adapted to yield under conditions of excessive pressure or temperature.

2. In a tank truck for the delivery of gasoline having a compartment including a normally closed top vent valve and a bottom valve to control the discharge of fluid from the compartment, the combination wherein said vent valve is provided with a cover having permanently open side vents and an auxiliary top opening normally closed by a member releasable by the heat of fusion so that in case of fire, excessive pressures within the compartment will be free to discharge through the auxiliary top opening, said vent valve comprising a valve seat, a valve head and yieldable means for normally holding said valve head on said seat.

CARLYLE H. SCOTT.
PAUL H. SCOTT.